(12) United States Patent
Liang et al.

(10) Patent No.: US 8,725,569 B2
(45) Date of Patent: May 13, 2014

(54) LOCATION BASED USER BEHAVIOR ANALYSIS AND APPLICATIONS

(75) Inventors: Sam Song Liang, Palo Alto, CA (US); Jun Yang, Milpitas, CA (US); Chenyu Wang, Mountain View, CA (US); Zhigang Liu, Sunnyvale, CA (US)

(73) Assignee: Alohar Mobile Inc., Palo Alto, CA (US)

( * ) Notice: Subject to any disclaimer, the term of this patent is extended or adjusted under 35 U.S.C. 154(b) by 90 days.

(21) Appl. No.: 13/278,396

(22) Filed: Oct. 21, 2011

(65) Prior Publication Data

US 2012/0100869 A1 Apr. 26, 2012

Related U.S. Application Data

(60) Provisional application No. 61/406,198, filed on Oct. 25, 2010.

(51) Int. Cl.
*G06Q 30/00* (2012.01)
*G06Q 30/02* (2012.01)

(52) U.S. Cl.
CPC ........ *G06Q 30/0269* (2013.01); *G06Q 30/0261* (2013.01); *G06Q 30/0255* (2013.01); *G06Q 30/0251* (2013.01)
USPC .................. 705/14.66; 705/14.58; 705/14.53; 705/14.49

(58) Field of Classification Search
USPC ....................................... 705/14.66
See application file for complete search history.

(56) References Cited

U.S. PATENT DOCUMENTS 6,917,940 B1 * 7/2005 Chen et al. ............................ 1/1
6,975,873 B1 * 12/2005 Banks et al. ............... 455/456.5
7,483,946 B2 * 1/2009 Boyd ............................ 709/204
2002/0111172 A1 8/2002 Dewolf et al.
2003/0040946 A1 * 2/2003 Sprenger et al. .................. 705/6
2003/0176931 A1 * 9/2003 Pednault et al. ................. 700/31
2008/0215557 A1 * 9/2008 Ramer et al. ...................... 707/4
2009/0150067 A1 * 6/2009 Lindman ....................... 701/204

(Continued)

FOREIGN PATENT DOCUMENTS

KR 10-2010-006083 A 6/2010

OTHER PUBLICATIONS

Jarvis, "The internet is the social network", BuzzMachine, Feb. 2, 2008, found on line at buzzmachine.com/2008/02/02/the-internet-is-the-social-network/.*

(Continued)

*Primary Examiner* — John G Weiss
*Assistant Examiner* — Scott C Anderson
(74) *Attorney, Agent, or Firm* — Brian R. Short

(57) ABSTRACT

Methods, systems and apparatuses for generating a user profile of a mobile device user are disclosed. One method includes tracking user stays of the user over time, wherein the user stays include at least one location, and generating the user profile based at least in part on at least one of an arrival time, a time duration or a frequency of visits of the user at each of the user stays. Another method includes determining a current state of a mobile device user. The method includes tracking locations of user stays of the mobile device user over time, and determining a current state of a mobile device user based on user stays within a predetermined time of a present time, wherein the predetermined time is dependent upon an application of the user device or an observed behavior of a user of the user device.

27 Claims, 6 Drawing Sheets

(56) References Cited

U.S. PATENT DOCUMENTS

| | | |
|---|---|---|
| 2010/0041378 A1 | 2/2010 | Aceves et al. |
| 2010/0229190 A1 | 9/2010 | Koo et al. |
| 2011/0161427 A1 | 6/2011 | Fortin et al. |
| 2011/0184640 A1 | 7/2011 | Coleman et al. |
| 2011/0231305 A1* | 9/2011 | Winters .................. 705/39 |
| 2011/0238289 A1 | 9/2011 | Lehmann et al. |
| 2011/0239158 A1 | 9/2011 | Barraclough et al. |

OTHER PUBLICATIONS

Using GPS to Learn Significant Locations and Predict Movement Across Multiple Users; Daniel Ashbrook and Thad Starner, College of Computing, Georgia Institute of Technology.

Mining Personally Important Places from GPS Tracks; Changqing Zhou, Nupur Bhatnagar, Shashi Shekhar, Loren Terveen, Department of Computer Science and Engineering, University of Minnesota.

Extracting Places and Activities from GPS Traces Using Hierarchical Conditional Random Fields, Lin Liao Dieter Fox Henry Kautz, Department of Computer Science & Engineering University of Washington.

Mining Significant Semantic Locations From GPS Data, Xin Cao† Gao Cong† Christian S. Jensen, School of Computer Engineering, Nanyang Technological University, Singapore.

Mining GPS Data for Extracting Significant Places, G. Agamennoni, J. Nieto, E. Nebot, Australian Center for Field Robotics, University of Sydney, Australia.

Learning Significant User Locations with GPS and GSM, Department of Electrical Engineering and Computer Science, Massachusetts Institute of Technology, Sep. 2006.

* cited by examiner

LOCATION BASED USER BEHAVIOR ANALYSIS AND APPLICATIONS

FIELD OF THE DESCRIBED EMBODIMENTS

The described embodiments relate generally to location-based services. More particularly, the described embodiments relate to methods, systems and apparatuses for location based user behavior analysis and applications.

BACKGROUND

There is an increasing need to automatically monitor a mobile device user's location and other behavior, understand the user's habits and interests, and provide intelligent personal assistance to the user based on the user's habits and interests obtained through location based behavior analysis. Presently, location based services include manual check-ins. For a manual check-in, the user opens an application on their mobile device manually, and indicates that they are at a specific business.

Additionally, location-based searches are manual. That is, the user conducts a search of some business using keyword, such as "restaurant", and the application returns results that are the closest to the user's current location.

Other location-based service includes mobile social applications wherein, for example, friends are shown on a map. However, that services and applications are limited because they can't accurately determine the point of the interest the user is at, hard to disambiguate between multiple points of interest near each other. Generally, current local business or POI search is only using the spatial data as input, which does not generally provide enough information to accurately determine the point of interest.

It is desirable to have a method, apparatus and system for monitoring a mobile user's location and providing useful applications to the user based on location-based user behavior analysis.

SUMMARY

An embodiment includes a method of generating a user profile of a mobile device user. The method includes tracking user stays of the user over time, wherein the user stays include at least one location, and generating the user profile is based at least in part on at least one of an arrival time, a time duration or a frequency of visits of the user at each of the user stays, wherein for at least some embodiments, the user stays include points of interest the user has visited.

Another embodiment includes a method of generating a user profile of a mobile device user. The method includes tracking locations of points of interest of the user over time, wherein the user stays include at least one location, and generating the user profile is based at least in part on at least one of an arrival time, a time duration or a frequency of visits of the user at each of the points of interest.

Another embodiment includes a method of determining a current state of a mobile device user. The method includes tracking locations of user stays of the mobile device user over time, wherein the user stays include at least one location, and determining a current state of a mobile device user based on user stays within a predetermined time of a present time, wherein the predetermined time is dependent upon an application of the user device or an observed behavior of a user of the user device.

Another embodiment includes a mobile device. The mobile device includes a plurality of sensors and a processor. The processor is operative to receive at least one input from the plurality of sensors, and track locations of user stays of the user over time. Further, the processor is operative to generate the user profile based at least in part on at least one of an arrival time, a time duration or a frequency of visits of the user at each of the user stays.

Another embodiment includes a wireless system for generating a user profile of a user of a mobile device. The wireless system includes at least one of a mobile device or a network operative to receive at least one input from the plurality of sensors, and track locations of user stays of the user over time, wherein the user stays include at least one location. Further, the at least one of the mobile device and a server connected to the network are operative to generate the user profile based at least in part on at least one of an arrival time, a time duration or a frequency of visits of the user at each of the user stays.

Another embodiment includes a program storage device readable by a machine, tangibly embodying a program of instructions that when executed by the machine cause the machine to perform a method of generating a user profile of a user. The method includes tracking user stays of the user over time, wherein the user stays include at least one location, and generating the user profile is based at least in part on at least one of an arrival time, a time duration or a frequency of visits of the user at each of the user stays.

Other aspects and advantages of the described embodiments will become apparent from the following detailed description, taken in conjunction with the accompanying drawings, illustrating by way of example the principles of the described embodiments.

DETAILED DESCRIPTION

Figure 1:
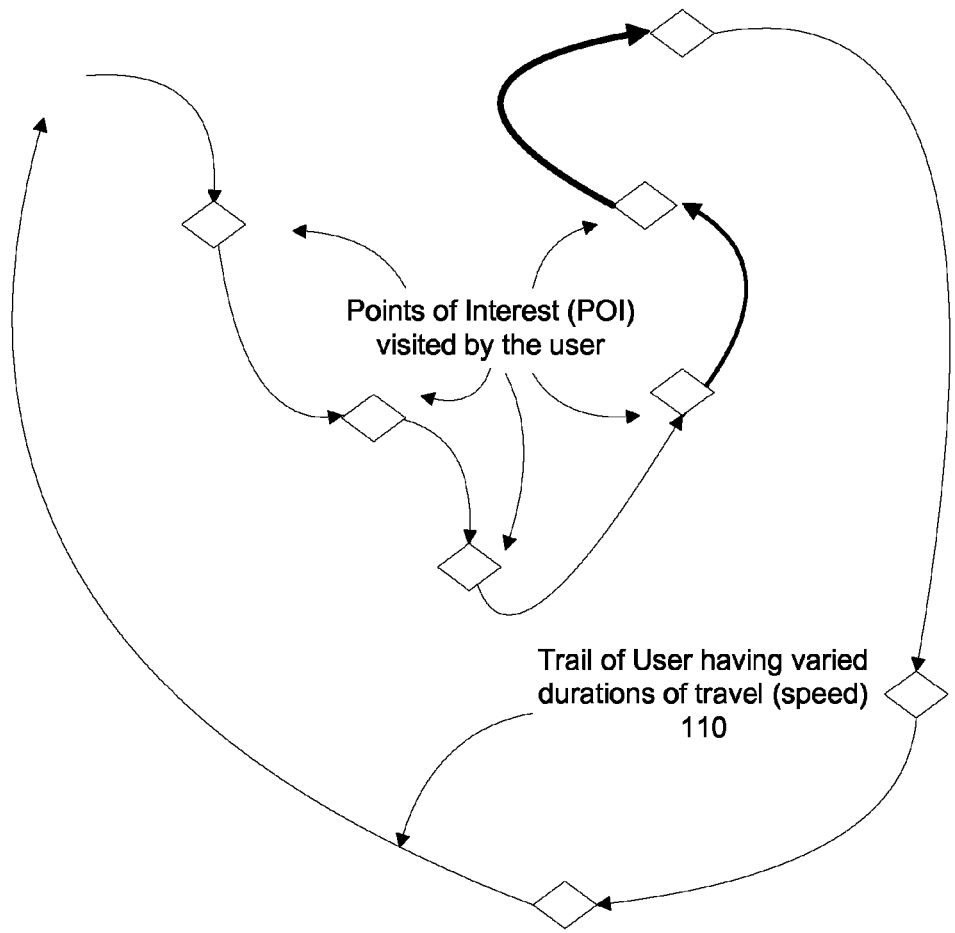
FIG. 1 shows an example of a map that depicts locations traveled by an individual that further depicts points of interest of the user.

The described embodiments include methods, systems and apparatuses for location based user behavior analysis and applications. At least some of the described embodiments provide apparatuses and methods that generate a location based user profile of a mobile device user, determine the current state of the user, predict the location behavior of the user and provide location/route based information to the user.

For the descriptions here, at least some embodiments of a point of interest (POI) is defined as a specific point location or place that someone may find useful or interesting. There can be at least two types of POIs: public POIs (e.g. stores, parks) that one can obtain from POI database services, and personal POIs (e.g. home, friend's home) that is personal to a mobile user.

A POI can have several properties, such as latitude and longitude, a name (e.g., Olive Garden), a category (for instance, restaurant), and a subcategory (for example, Italian cuisine). A POI can be of different sizes, and can have a hierarchical structure. For example, a POI can be a big park, such as Yosemite. Inside the park, there can be smaller POIs, such as a hotel or a restaurant. Furthermore, a POI can be associated with an event name (for example, a concert of Beatles, or a baseball game in a stadium, a seminar on cooking).

For at least some of the embodiments described, a user stay is defined as an event in which a specific user visits a specific POI at a specific time. For embodiments, each user stay has attributes including reference to the POI, start time of the visit, duration of the visit, and the device (as a proxy of the user) that detects the visit. A user stay can be detected by clustering user location data continuously collected by the mobile device of a user, computing the cluster's centroid, and then matching it to a nearby POI. In addition to its geographical presence, a user stay can include temporal presence, such as events scheduled at the specific POI. For example, the POI like a stadium can have football game on Friday, a concert on Saturday, and a baseball game on Sunday. For at least some embodiments, such an event is defined as an event of interest (EOI), which can be an attribute of a user stay.

For at least some embodiments, the determinations of user stays and the user's points of interest are automatic. That is, user stay and/or POI determination processing is automatically executed without the user proactively or reactively providing input. For some embodiments, the determination of the user's user stays and/or POIs does not require manual input from the user. The processing can be performed in the background, and operate on persistently collected sensor data (optionally uploading the data to a server). For an embodiment, a background processing algorithm determines the user stay and/or POI. Note, all or portions of the user stay and/or POI determination algorithms can run on both mobile client side (the mobile device) and server side (a server connected to the mobile device through a network). Other embodiments include semi-automatic processing in which a user's input or feedback can optionally be included with the processing to improve the process. For example, user inputs, such as correcting or adding or deleting a user stay and/or POI, can be used as important feedback information to boost the performance of overall user stay and/or POI determination processing.

For some embodiments, the processing is performed (at the mobile device and/or at the server) in real-time, and for some embodiments the processing includes post-processing. For real-time processing, the user stay and/or POI determination is made with a short delay (e.g. 10 seconds or a minute) after the user arrives at the user stay and/or POI, with a determination deadline being adaptively specified depending on the application. For post-processing, the user stay and/or POI determination is made beyond the short delay (or without a deadline).

For at least some embodiments, a current state of a user is defined as the user's current location, time and what the user is doing. Furthermore, current state can include user stays of that user within a predetermined time window before a present time, wherein the predetermined time window has variable length dependent upon application requirements and the location behavior being observes. For example, the time window of current state can be past few seconds, past hour, this morning (or afternoon), today, this week, or this month etc. As a result, the location of current state can be the POI (e.g. a restaurant) the user is staying right now if the time window is a few seconds or a larger area (e.g. San Francisco) in case the time window is past few days.

Embodiments include tracking user stays of the user over time, wherein the user stays include at least one location and creating a user profile for the user based at least in part on at least one of an arrival time, a duration or a frequency of visits of the user at each of the user stays. For at least some embodiments, the user profile is defined as the results of location based user behavior analysis. For at least some embodiments, the user profile includes the fundamental statistics, such as the number of visits, the time of visit, and the average and total duration of all visits to one POI. Furthermore, for at least some embodiments the user profile includes location behavior patterns learned from the fundamental statistics. For example, it includes user's location preference, such as which POIs or EOIs a user visits often, at what time of the day and/or day of week, user's location transitions between different POIs, and user preferred routes between POIs according to trail information. For example, the statistical transitions can include one-step location behavior change, such as the user visiting place A after place B, or multi-step location behavior change, visiting place A after place B and then going to place C. In addition, for at least some embodiments, the user profile includes user manually input preferences. The user profile includes characteristics of the user. One characteristic of the user includes a history of locations of interest of the user. For at least some embodiments, the user profile includes the statistics of the categories and subcategories of the POIs and EOIs the user has visited.

For at least some exemplary embodiments, route-based information is defined as the name of each route a user takes, the route usage frequency, the time when the route is usually taken, and the general speed information on the route.

Embodiments include a prediction engine that processes dynamic inputs from the user profile of a user and current state of the user to infer future POIs the user may visit and the routes the user may take. The prediction results can be used for providing targeted information to the user.

Once the profile has been created, the user can be provided with targeted information based on the user profile. Additionally or alternatively, a likelihood of confirmation of targeted advertising based on the user profile can be estimated. Additionally, the user profile can be supplemented based at least in part on websites visited by the user.

Embodiments include providing the user with at least one suggestion based on the identified points of interest. For an embodiment, this includes providing the user with at least one suggestion based on at least one predicated future point of interest. For an embodiment, a suggestion is modified based on the user profile. For example, a user profile could be used to determine that a user has already satisfied the condition of the suggestion because profile of the user suggests the user has already visited the appropriate location. Clearly, modifying can include changing or removing the suggestion.

As an example of the use of suggestions, a user's shopping list can be tracked, and the items on the shopping list can be correlated with the shops (special POIs) the user usually visits. When the user is physically close to a shop that has one or more items on the user's shopping list, a suggestion can be generated to remind the user to stop by the shop to purchase the item.

After such a suggestion is generated, the mobile device monitors the user's location history, and if it detects that the user stops at the specific shop, where a specific item on the shopping list has been in one of the suggestions presented to the user, the system can automatically remove the specific items, or reduce the priorities of those items.

Examples of intelligent personal services include spatial suggestions. An exemplary spatial suggestion includes a reminder to a user of a mobile device that is based on spatial information of the mobile device. Reminders include suggestions that are useful to the user. Intelligent personal services include, for example, making health-related suggestions, such as doing more physical activities (e.g. walking) than sitting still. Embodiments of personal services include providing recommendations or suggestions to the user based on the user's habits and interests, for example, kid-centric events during a weekend for people with children. Services can also include commercial services, such as recommending a cheaper gas station near the user's regular commute route.

Location based user behavior analysis can also be useful to a mobile advertiser. For example, after a mobile advertiser has displayed an advertisement to a user, the advertiser would like to determine if the user has been to the merchant in the advertisement and conducted business, and determine if the advertisement has been confirmed. Additionally, advertisers desire user profile information, which enables the advertiser to intelligently send targeted advertisements.

When, for example, the system detects that the user often goes to an elementary school or a child day care center, the system infers that the user may have one or more children, then the system may generate targeted information to the user for child-related events.

After the system detects the user usually go to a local public library on Saturday morning, the system can automatically generate a suggestion on Saturday morning when the user leaves home to remind the user to bring the books to return to the library.

The system tracks when the user gets gasoline for his car, and tracks the number of miles the user has driven the car after each refill. When the system detects that the user has used most of the gasoline in his tank based on the number of miles driven and the speed, as a result of the road type, such as local streets or high ways, the system can start to find gas station with low prices and make targeted information to the user.

FIG. 1 shows an example of a map that depicts locations traveled by an individual that further depicts points of interest. A line 110 depicts the locations traveled by the user. During the travels of the user, the user visits various points of interest. Based on the visited locations, additional points of interest can be recommended and/or suggested to the user.

The trail of the user can be marked by differing speeds (depicted by varying thickness of the line 110) of travel between points of interest. The travel speed can be used as one piece of information in the determination of trails of interest.

A series of points of interest (such as shown in FIG. 1) can be termed a "trail of interest". The trail of interest includes a sequence of location data points. Embodiments of each location data point can include the attributes of latitude, longitude, altitude, speed and/or a timestamp. More specifically, an embodiment of a trail of interest is defined by a plurality of points of interest of the user. For an embodiment, a frequency and/or speed of the user between points of interest is used to determine a level of importance of the trail. For example, if a user travels along one part of a trail (or route) frequently, with low speed (meaning it is a local street, rather than high way, which can be verified by using a geo-database), then some types of services along the this part of the trail can be recommended to the user, with the expectation that it is more likely for the user to use the service, because it is easier for the user to stop by the service. For an embodiment, the level of importance is included within a user profile.

Figure 2:
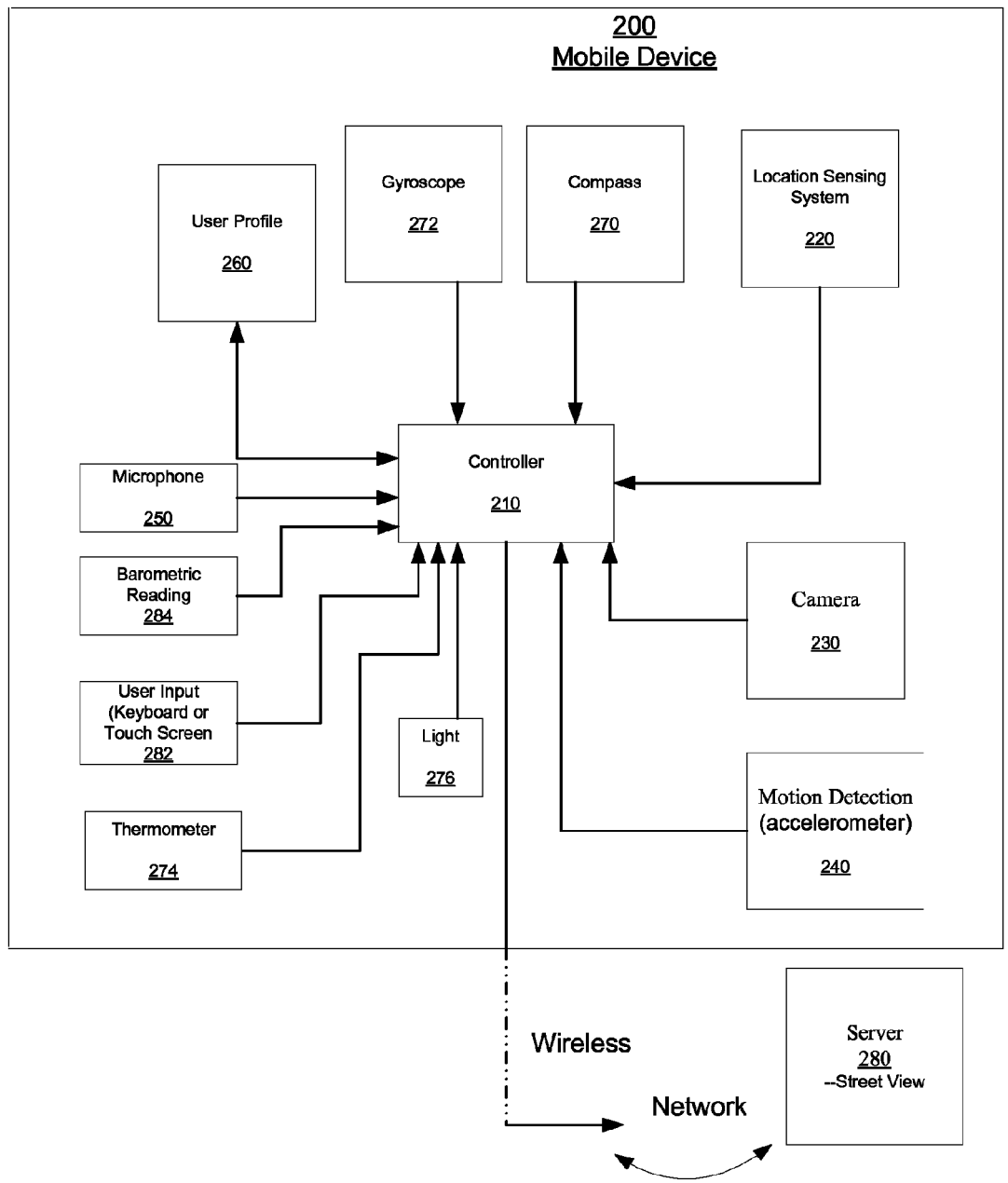
FIG. 2 shows an example of a mobile device that the disclosed embodiments for generating a user profile of the mobile device user are operable.

FIG. 2 shows an example of a mobile device that the disclosed embodiments for generating a user profile of the mobile device user are operable. For embodiments, user location data is continuously collected from the mobile device over time. The data can consist of multiple streams of sensor data with timestamps.

Spatial information (such as, longitude, latitude, altitude) of the user can be determined by a location sensing system, such as a global positioning system (GPS), 220 and/or network-based location, such as location determined by cellular and/or WiFi networks of the mobile device 200. Based on the spatial information, a controller 210 (or another controller connected to the controller 210) of the mobile device 200 can roughly determine locations of the user. GPS, however, can be limited because the exact location or the actual business (point of interest) visited by the user may not determinable from GPS alone. Embodiments provide alternate or additional pieces of location information as determined by the controller 210, or a controller electronically connectable to the controller 210.

Signals sensed by a motion sensor (for example, an accelerometer) 240 can be used to provide additional user-related information. That is, for example, the GPS 220 may be precise enough to narrow down the identification of a location of interest to three businesses. The signals generated by the motion sensor 240 can provide an indication of activity of the user, which can be used to additionally identify a location of interest. For example, when a department store (e.g. Walmart®) is located next to a cafe (e.g. Starbucks®), the user's motion pattern can be used to disambiguate between the two POI (points of interest), Walmart and Starbucks. If the user's motion pattern indicates that the user has been walking around most of the time, then the probability that the user visited the department store is higher. On the other hand, if the user's motion pattern indicates that the user has been sitting still most of the time, then the probability that the user visited the cafe is higher.

Images captured by a camera 230 of the mobile device 200 can be used to provide additional user-related information. That is, for example, signs on business proximate to the user's location can be used to determined points of interest.

Audio signals sensed by a microphone 250 of the mobile device 200 can be used to provide additional user-related information. That is, for example, loud noise versus quiet noise in the background of a user's location can be used to aid in determination of points of interest. For example, because the noise level in a library is usually low, if the noise level is low, then the probability that the user is in a library is higher than the probability that user is in a restaurant.

Direction of the user can be determined by, for example, a compass 270 of the mobile device 200. The compass 270 can provide present or historical directions of the user. The directions of the user can be used to aid in the determination of points of interest.

Rotation of the user can be determined by, for example, a gyroscope 272 of the mobile device 200. The gyroscope 272 can provide present or historical rotation of the mobile device of that the user carries. The rotation of the mobile device of the user can be used to aid in the determination of points of interest.

An ambient temperature of the user can be determined by, for example, a thermometer 274 of the mobile device 200. The thermometer 274 can provide present or historical ambient temperatures of the user. The temperature of the user can be used to aid in the determination of points of interest. For example, temperature can be used to determined whether the user is or was outside versus inside.

Exposure to ambient light by the user can be determined by, for example, a light sensor 276 of the mobile device 200. The light sensor 276 can provide present or historical light exposure of the user. The light exposure of the user can be used to aid in the determination of points of interest. For example, sensed levels of IR can be used to determine whether the mobile device of the user is, for example, in the user's pocket, and to determine whether the user is in direct sun light.

User-input information can be received from a key-board or touch screen 282. Based on a determination that the user is using the input (key-board or touch screen) behavior if the user can be inferred, and therefore, educated guesses can be made regarding the location of the user. For example, if the user is inputting information, the user is probably not driving. If the user is talking, the user is probably not at a movie theater.

Barometric information from a barometric sensor 284 can be sensed and used to determine user-related information. For example, the barometric information can be used to deduce an altitude of the user, and therefore, be used to determine what floor of a building the user is presently located. GPS can be inaccurate inside of buildings, and therefore, barometric information can be very useful.

A network that the mobile device 200 is connected to, can provide additional user-related information. For example, a server 280 of the network can have street view images that provide additional information regarding a general location that a user is at. The connection to the remote server 280 is optional, because the mobile device may be disconnected from the server. In addition, part of the user profile computation can be performed on the mobile device, and may not be required to be run on the server.

The sensors of the mobile device 200 can be used to generate and/or influence a user profile 260 of the user of the mobile device 200.

Figure 3:
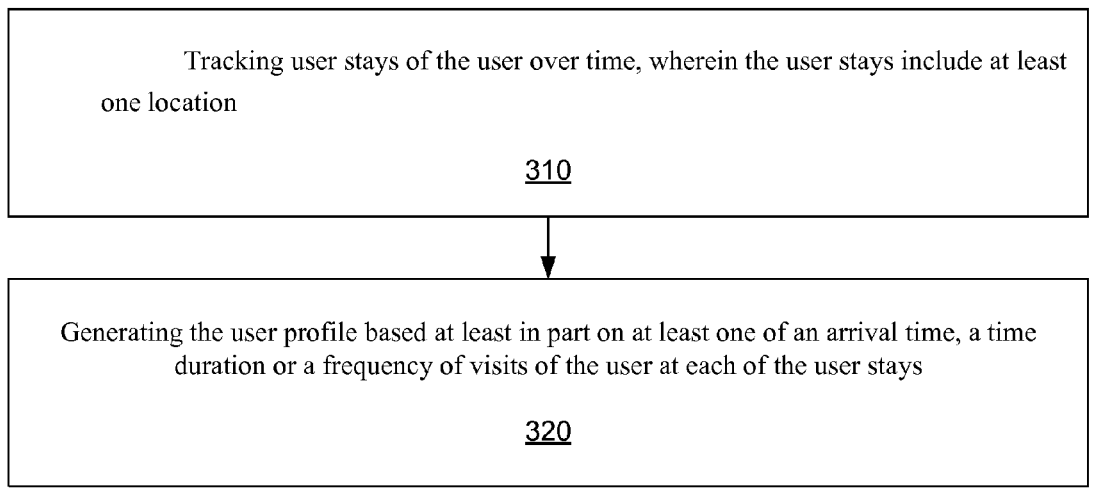
FIG. 3 is a flow chart that includes steps of an example of a method of generating a user profile of a mobile device user.

FIG. 3 is a flow chart that includes steps of an example of a method of generating a user profile of a mobile device user. A first step 310 includes tracking user stays of the user over time, wherein the user stays include at least one location. A second step 320 includes generating the user profile based at least in part on at least one of an arrival time, a time duration or a frequency of visits of the user at each of the user stays.

Figure 4:
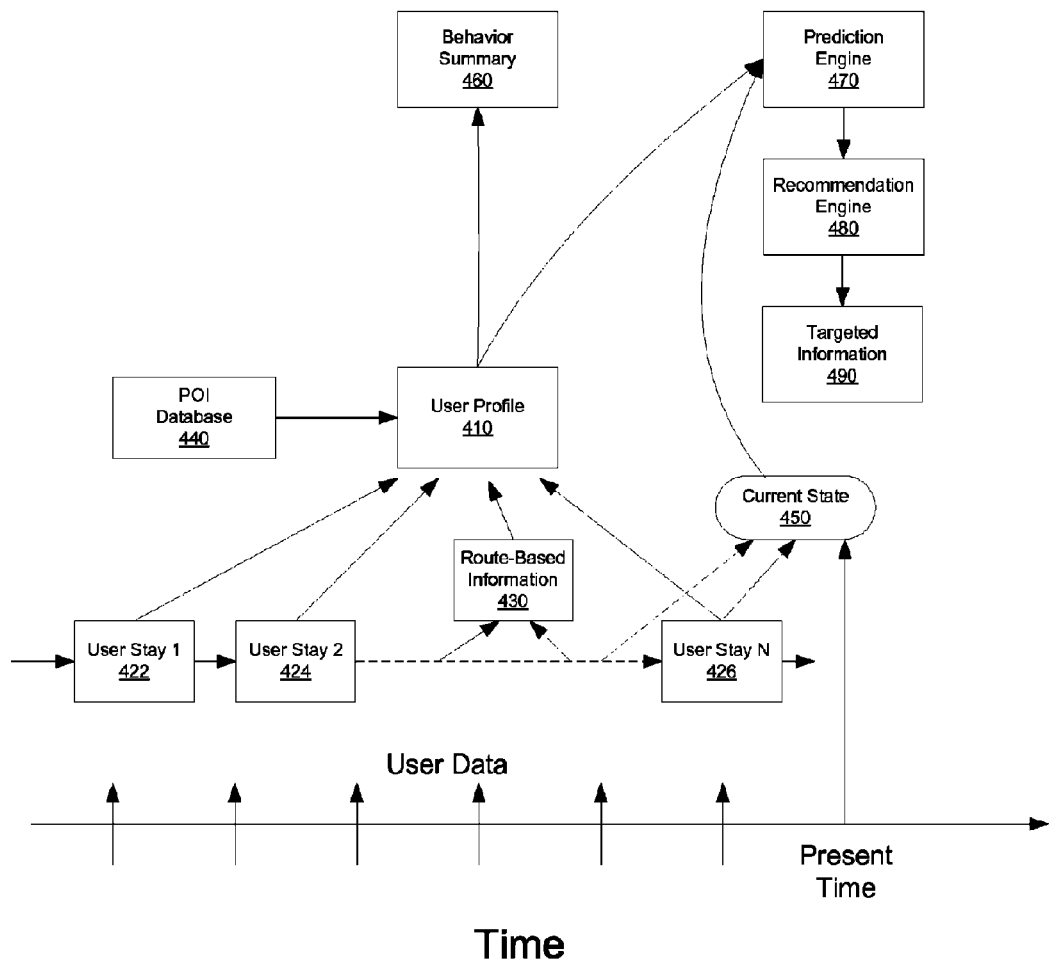
FIG. 4 is a block diagram that illustrates an example of a user profile generation system.

FIG. 4 is a block diagram that illustrates an example of a user profile generation and usage system. The previously described user stays (such as, user stays 422, 424, 426) are generated over time by the historical user location data, in which each is referenced to a POI in a POI database 440. Route-based information 430 can be inferred from historical commuting behavior of the user moving from one POI to another POI. Embodiments includes a user profile 410 that is generated and continuously updated based on, for example, POIs from a POI database 440, the user stays 422, 424, 426 and route-based information 430. A user profile is generated by analyzing all user stays of the user and extracting user behavior patterns. The user profile 410 can be used to generate a behavior summary 460 of the user of the mobile device. Behavior summary of a user can be created based on the user profile, at a daily, weekly, monthly or yearly basis.

In addition to the user profile 410, embodiments further include determining a current state 450 of the user of the mobile device. As shown, an embodiment of the current state is based upon current user stay information 426 and/or recent user stays, and current user data.

Based on the user profile 410 and the current state 450, predictions of the behavior of the user can be made by, for example, a prediction engine 470. Prediction engine 470 takes static inputs from the user profile 410, such as frequently visited POIs and transitional patterns between POIs, and dynamic inputs from the current state 450 to infer the routes the user may take and POIs the user may visit in the future. Based on the predicted behavior, recommendation can be provided to the user via recommendation engine 480 and targeted information 490 can be provided to the user of the mobile device. The prediction engine 470 can be disabled so that the recommendation engine 480 can make targeted information based on the user profile 410 and the current state 450 directly.

An embodiment includes tracking a current state of the user. For embodiments, the current state includes user stays within a predetermined time of a present time, wherein the predetermined time is dependent upon an application of the user device or an observed behavior of a user of the user device.

For at least some embodiments the user profile includes a history of the user stays of the user. For an embodiment, the user stay includes the point of interest the user has visited, an arrival time and a length of time the user stays at the point of interest.

At least some embodiments further include determining route-based information. Further, embodiments include updating a current state of the user based on the route-based information. Another embodiment further includes predicting future user stays based on the route-based information. Embodiments of determining route-based information include determining a plurality of points of interest, wherein the plurality of points of interest define a trail of interest of the user. As previously described, an embodiment a trail of interest is defined by a plurality of points of interest of the user. For an embodiment, a frequency and/or speed of the user between points of interest is used to determine a level of importance of the trail.

At least some embodiments further include providing the user with targeted information base on the user profile. For specific embodiments, the targeted information includes at least one of coupons, advertisement, notices of events. Other embodiments include estimating a likelihood of conversion of targeted advertising based on the user profile, and/or measuring a conversion of targeted advertising based on the user profile. Additionally, a rewards-based program can be facilitated based on the user profile. That is, visits to a merchant can be monitored, and rewards automatically applied based on visits to the merchant.

For an embodiment, the user profile is supplemented based at least in part on websites visited by the user. For one implementation further includes supplementing the user profile based on information posted by the user on at least one of the websites. For another implementation, at least one of the websites comprises a social website.

Embodiments include providing the user with suggestions. For example, one embodiment includes providing the user with at least one suggestion based on identified points of interest. Another embodiment includes providing the user with at least one suggestion based on at least one predicated future point of interest. Further, embodiments include modifying (including changing or removing) a suggestion based on the user location history and user profile.

Figure 5:
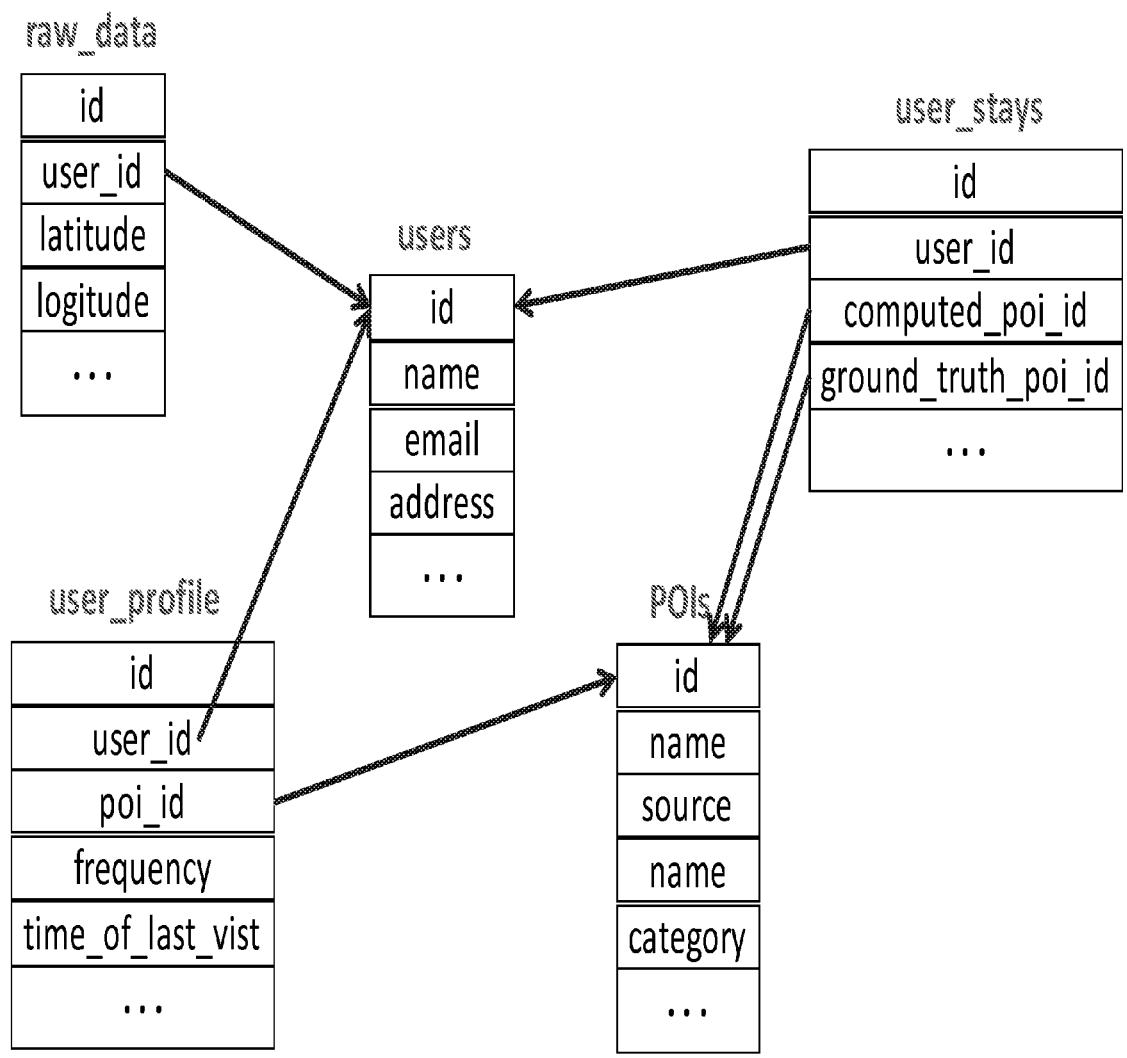
FIG. 5 shows an example of the database schema, according to an embodiment.

FIG. 5 depicts one example of the database schema used in the location behavior system. "users" table is to store information of each user registered with the system. "raw_data" table stores all the sensor data and client state information uploaded to the server by the client running in a device owned by a user. The sensor data can include GPS samples, network location samples, WiFi information, motion, etc. The client state information can include GPS ON/OFF, state transitions and reasons. Each entry in the table has a reference to the user for whom the data was collected. "user_stays" table stores all user stays detected by the system after processing the entries in the raw_data table. A user stay has attributes such as the computed location (i.e. latitude and longitude), start time, duration. More importantly, embodiments of the system try to match a user stay to a POI, which is captured in the "computed_poi_id" column. The match may be wrong, so the system uses "ground_truth_poi_id" to refer to the actual POI the user visited based on input from the user. "POIs" table stores all the POI entries used by the system. Note that there are two types of POIs: public POIs (e.g. restaurants) that we obtained from third party databases, or personal POIs (e.g. homes) that were entered by users manually. The "source" column is used to differentiate these two types. "user_profile" table stores the association between a user and a POI. It's part of the user profiling by the system. Each entry includes attributes such as how frequent the user visits the POI, when was the last visit, typical time/day of the visits, etc. The table is generated by analyzing the data in "user_stays" table.

Figure 6:
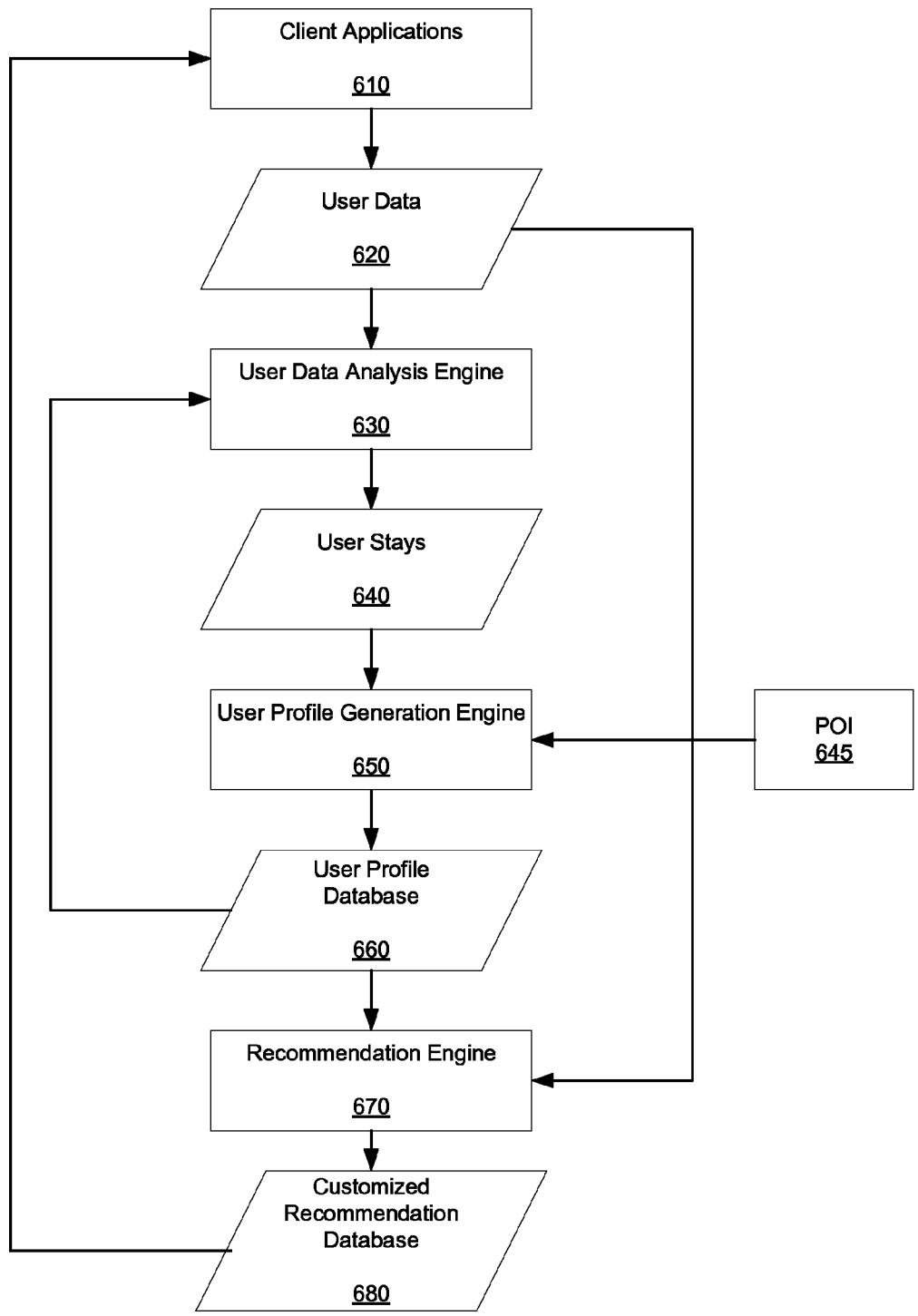
FIG. 6 shows an example of server-side processing, according to an embodiment.

FIG. 6 depicts the general architecture of the system, which collects user data through the Client Applications (610) running on the mobile device, stores the user data in the User Data Database (620), determines the user's user stays through the User Data Analysis Engine (630) based on the user data and previous user profile stored in the User Profile Database (660), stores the user stay results in the user stay Database (640), runs the User Profile Generation Engine (650) (which accesses Points of Interest from a POI Database 655), generates the user profiles and stores them in the User Profile Database (660), generates customized targeted information to the user based on the user profile and the current user data through the Recommendation Engine, stores the targeted information in the Customized Recommendation Database, and finally presents the customized recommendation to the user through the Client Applications (610).

An embodiment includes a program storage device readable by a machine, tangibly embodying a program of instructions that when downloaded and executed by a mobile device cause the mobile device to perform a method of generating a user profile of a user. As previously described, the method includes tracking user stays of the user over time, wherein the user stays include at least one location, and generating the user profile based at least in part on at least one of an arrival time, a time duration or a frequency of visits of the user at each of the user stays.

Although specific embodiments have been described and illustrated, the embodiments are not to be limited to the specific forms or arrangements of parts so described and illustrated.

What is claimed:

1. A method of generating a user profile of a user of a mobile device, comprising:

persistently sensing, by at least one sensor of the mobile device, at least spatial information of the mobile device;

automatically determining and tracking a plurality of user stays of the user over time without the user proactively or reactively providing input associated with a location or a point of interest for at least one of the plurality of user stays, wherein the plurality of user stays include at least one location, wherein the at least one location is determined at least in part by the sensed spatial information, and wherein the at least one user stay comprises a point of interest the user has visited, an arrival time and a length of time the user stays at the point of interest, wherein the at least one user stay is detected by clustering user location data continuously collected by the mobile device of the user, and matching the clustered user location data with a nearby point of interest;

generating and continuously updating, by a controller of the mobile device or a controller connected to the mobile device, the user profile based at least in part on statistics of the plurality of user stays including an arrival time, a time duration and a frequency of visits of the user at least one of the plurality of user stays, wherein the time duration includes an amount of time the user stays at a location as determined by the sensed at least spatial information; and wherein the user profile further comprises location behavior patterns including location transitions detected between different points of interest, user preferred routes between points of interest and frequency and speed of the user between points of interest.

2. The method of claim 1, further comprising tracking a current state of the user.

3. The method of claim 1, wherein the user profile comprises a history of the user stays of the user.

4. The method of claim 1, wherein the user stay comprises an event of interest the user has visited, an arrival time and a length of time the user stays at the event of interest.

5. The method of claim 2, wherein the current state comprises user stays within a predetermined time of a present time, wherein the predetermined time is dependent upon an application of the user device or an observed behavior of a user of the user device.

6. The method of claim 1, further comprising determining route-based information, wherein the route-based information includes a route usage frequency, a time when the route is usually taken, and general speed information on the route.

7. The method of claim 6, further comprising updating a current state of the user based on the route-based information, wherein the current state includes current location, time and what the user is doing.

8. The method of claim 6, further comprising predicting future user stays based on the route-based information.

9. The method of claim 6, wherein determining route-based information comprises:

determining a plurality of points of interest, wherein the plurality of points of interest define a trail of interest of the user, and wherein the trail of interest is based on tracking of user stays of the user over time.

10. The method of claim 1, further comprising providing the user with targeted information base on the user profile.

11. The method of claim 10, wherein the targeted information comprises at least one of coupons, advertisement, notice of events.

12. The method of claim 1, further comprising estimating a likelihood of conversion of targeted advertising based on the user profile.

13. The method of claim 1, further comprising measuring a conversion of targeted advertising based on the user profile.

14. The method of claim 13, further comprising supplementing the user profile based at least in part on websites visited by the user.

15. The method of claim 14, further comprising supplementing the user profile based on information posted by the user on at least one of the websites.

16. The method of claim 14, wherein at least one of the websites comprises a social website.

17. The method of claim 1, further comprising providing the user with at least one suggestion based on identified points of interest.

18. The method of claim 1, further comprising providing the user with at least one suggestion based on at least one predicated future point of interest.

19. The method of claim 18, further comprising modifying a suggestion based on the user location history and user profile.

20. The method of claim 1, further comprising generating a trail of interest based on tracking user stays of the user over time, wherein the user stays include at least one location, wherein the at least one location is based on the sensed at least spatial information.

21. The method of claim 20, further comprising using a frequency and/or speed of the user between points of interest to determine a level of importance of the trail.

22. The method of claim 21, wherein the level of importance of trail is included within the user profile.

23. A method of determining a current state of a user of a mobile device, comprising:
  persistently sensing, by at least one sensor of the mobile device, at least spatial information of the mobile device;
  automatically determining and tracking a plurality of user stays of the user over time without the user proactively or reactively providing input associated with a location or a point of interest for at least one of the plurality of user stays, wherein the plurality of user stays include at least one location, wherein the at least one location is determined at least in part by the sensed spatial information, and wherein the at least one user stay comprises a point of interest the user has visited, an arrival time and a length of time the user stays at the point of interest, wherein the at least one user stay is detected by clustering user location data continuously collected by the mobile device of the user, and matching the clustered user location data with a nearby point of interest;
  determining a current state of a mobile device user based on user stays of the plurality of user stays within a predetermined time of a present time, wherein the predetermined time is dependent upon an application of the user device or an observed behavior of a user of the user device.

24. A mobile device, comprising:
  a plurality of sensors operative to sense at least spatial information of the mobile device;
  a processor operative to receive at least one input from the plurality of sensors, and track locations of a plurality of user stays of the user over time without the user proactively or reactively providing input associated with a location or a point of interest for at least one of the plurality of user stays, wherein the tracked locations are determined at least in part by the spatial information, and wherein at least one of the plurality of user stays comprises a point of interest the user has visited, an arrival time and a length of time the user stays at the point of interest, wherein the at least one user stay is detected by clustering user location information data continuously collected by the mobile device of the user, and matching the clustered user location data with a nearby point of interest;
  the processor operative to generate and continuously update the user profile based at least in part on statistics of the plurality of stays including an arrival time, a time duration and a frequency of visits of the user at each of the user stays, wherein the time duration includes an amount of time the user stays at a location as determined by the sensed at least spatial information; and wherein
  the user profile further comprises location behavior patterns including location transitions detected between different points of interest, user preferred routes between points of interest and frequency and speed of the user between points of interest.

25. A wireless system for generating a user profile of a user of a mobile device, comprising:
  at least one of a mobile device or a network operative to receive at least one input from the plurality of sensors, and track locations of a plurality of user stays of the user over time without the user proactively or reactively providing input associated with a location or a point of interest for at least one of the plurality of user stays, wherein the tracked locations are determined at least in part by sensed spatial information, and wherein at least one of the plurality of user stays comprises a point of interest the user has visited, an arrival time and a length of time the user stays at the point of interest, wherein the at least one user stay is detected by clustering user location information data continuously collected by the mobile device of the user, and matching the the clustered user location data with a nearby point of interest; and
  at least one of the mobile device and a server connected to the network operative to generate and continuously update the user profile based at least in part on statistics of the plurality of stays including an arrival time, a time duration and a frequency of visits of the user at each of the user stays, wherein the time duration includes an amount of time the user stays at a location as determined by the sensed spatial information; and wherein
  the user profile further comprises location behavior patterns including location transitions detected between different points of interest, user preferred routes between points of interest and frequency and speed of the user between points of interest.

26. A non-transitory program storage device readable by a machine, tangibly embodying a program of instructions that when downloaded and executed by a mobile device cause the mobile device to perform a method of generating a user profile of a user, comprising:
  automatically determining and tracking a plurality of user stays of the user over time without the user proactively or reactively providing input associated with a location or a point of interest for at least one of the plurality of user stays, wherein the plurality of user stays include at least one location, wherein the at least one location is determined at least in part by the sensed spatial information, and wherein the at least one user stay comprises a point of interest the user has visited, an arrival time and a length of time the user stays at the point of interest, wherein the at least one user stay is detected by clustering user location data continuously collected by the mobile device of a user, and matching the clustered user location data with a nearby point of interest;
  generating and continuously updating, by a controller of the mobile device or a controller connected to the mobile device, the user profile based at least in part on statistics of the plurality of user stays including an arrival time, a time duration and a frequency of visits of the user at least one of the plurality of user stays, wherein the time duration includes an amount of time the user stays at a location as determined by the sensed at least spatial information; and wherein
  the user profile further comprises location behavior patterns including location transitions detected between different points of interest, user preferred routes between points of interest and frequency and speed of the user between points of interest.

27. The program storage device of claim 26, wherein the program is downloadable to a mobile device of the user.

* * * * *